July 28, 1959  M. D. McFARLANE ET AL  2,897,332
TEMPERATURE CONTROL DEVICE

Original Filed Nov. 9, 1955  3 Sheets-Sheet 1

INVENTORS.
Maynard D M<sup>c</sup>Farlane
and Cecil A. Crafts.
BY

*Alb. J. Henderson*

THEIR ATTORNEY

July 28, 1959 M. D. McFARLANE ET AL 2,897,332
TEMPERATURE CONTROL DEVICE
Original Filed Nov. 9, 1955 3 Sheets-Sheet 2

INVENTORS.
Maynard D. McFarlane
and Cecil A. Crafts.
BY

THEIR ATTORNEY.

United States Patent Office 2,897,332
Patented July 28, 1959

2,897,332

TEMPERATURE CONTROL DEVICE

Maynard D. McFarlane, Corona del Mar, and Cecil A. Crafts, Pasadena, Calif., assignors to Robertshaw-Fulton Controls Company, Greensburg, Pa., a corporation of Delaware Original application November 9, 1955, Serial No. 545,860. Divided and this application March 27, 1957, Serial No. 648,973

10 Claims. (Cl. 219—20)

This invention relates to heating control devices and more particularly to devices wherein the heating medium consists of a slurry of fusible material having a melting temperature of a value to be controlled.

In systems requiring accurate temperature control for long periods of time wherein temperature differentials do not exceed a few hundredths of a degree and the system experiences varying ambient temperature conditions or heat applications, accurate control has been extremely difficult if not impossible since present day thermostats are incapable of performing within such close tolerances. Such a system may comprise a crystal oscillator circuit wherein extreme frequency stability is required. Since crystal control units are susceptible to even a slight temperature variation, drifting from the desired set frequency can be overcome only by immersing the crystal unit in an atmosphere having a continuous constant temperature condition.

In the present invention which is a division of our application Serial No. 545,860, filed November 9, 1955, advantage has been taken of the physical property exhibited by materials and alloys at their melting temperatures. The melting point of an alloy is an exactly reproducible and stable value, and may be prescribed and varied by modifying the quantity of components which go to make up the alloy. At the melting temperature, advantage is taken of the latent heat of fusion of the material used so that this exact temperature is maintained over a wide range of external temperature conditions.

At the melting temperatures, the materials consist of a slurry composed partly of solid material and partly of liquid. Since the melting point temperature is independent of the ratio of liquid to solid, the slurry can be maintained at constant internal temperature over a wide range of heat application from a heating element or the like. In the use of an electrical heating element, extremely accurate control of the temperature of the crystal oscillator circuit can be maintained with intermittent or widely varying applications of power to the heating element. Since a change of state is involved at the desired temperature, which is the melting point of the alloy, the change in electrical resistance upon this change of state has been utilized to control the amount of power delivered to the heating element.

For example, with some compositions, there exists a change in resistance of approximately 90% between the solid and liquid state of the alloy. It is, therefore, apparent that the present invention utilizes a characteristic of a fusible alloy which controls the application of heat to the system through a change occurring in the material itself. Thus, the melting temperature of the alloy at the point of change of state or at the so-called "triple point" not only regulates the heat applied to a heating space but it also acts inherently as a thermostat to control the application of heat to the entire system.

In another embodiment of the present invention, the proportional change in viscosity of the alloy in transforming from the solid state to the liquid state, is utilized to effect heating conditions of the alloy. Since the slurry consists of a mixture of liquid and solid material, it will be apparent, that the viscosity of the slurry is a function of the change of state, and in fact, the viscosity will vary over a very large range as the material changes from completely solid to completely liquid. A novel arrangement of a mixing arm and circuit means for rotating the same is utilized to effect accurate temperature control of the slurry.

Therefore, it is the principal object of the present invention to utilize the melting temperature at which the change of state of a material occurs to regulate both the heat output of the material and the heat producing medium applied to the material.

Another object of the present invention is to accurately control the temperature of a space within very precise limits for indefinite periods of time under varying conditions of heat application.

Other objects and advantages will appear from the following specification taken in conjunction with the accompanying drawings wherein.

Figure 1:
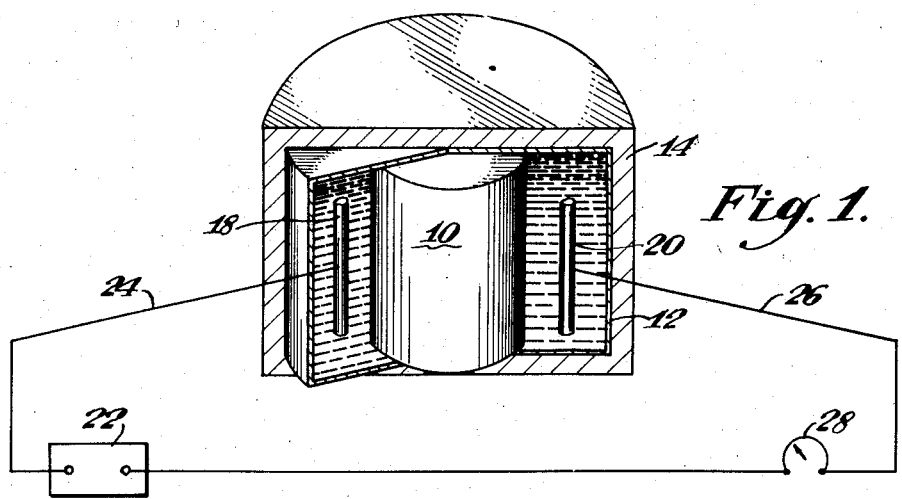
Fig. 1 is a schematic view of a typical arrangement of the present invention.

Referring more particularly to Fig. 1, there is shown an inner container 10 which serves as an oven or heating space wherein a crystal oscillator unit may be housed. An outer container 12 completely encases the container 10 and is suitably lined with insulation 14 for reducing heat losses and hence the power supplied as will presently appear. Completely filling the outer container 12 is a fusible conductive alloy 16 composed of materials which will fuse when heated to a prescribed melting temperature, and which is so chosen as to possess a high latent heat of fusion.

As an example, for a temperature of 60° C., this alloy is satisfactory:

| | Percent |
|---|---|
| Sodium | 60 |
| Thalium | 40 |

For 70° C., the following has been found satisfactory:

| | Percent |
|---|---|
| Sodium | 73 |
| Gold | 27 |

For 80° C., the following has been found satisfactory:

| | Percent |
|---|---|
| Sodium | 40 |
| Thalium | 60 |

For 93° C., the following has been found satisfactory:

| | Percent |
|---|---|
| Tin | 42 |
| Cadmium | 14 |
| Indium | 44 |

For 118° C., the following has been found satisfactory:

| | Percent |
|---|---|
| Tin | 47 |
| Indium | 53 |

For 120° C., the following has been found satisfactory:

| | Percent |
|---|---|
| Thalium | 73 |
| Gold | 27 | or

| | |
|---|---|
| Indium | 75 |
| Cadmium | 25 |

Potassium alone may be used at a temperature of 63.7° C.; sodium alone for 97.8° C. and Caesium alone for 28.5° C.

A pair of electrodes 18, 20 are immersed in the material 16 and are connected to the terminals of a low voltage-high amperage battery 22 by conductors 24, 26 through a regulating resistor 28. In order to electrically insulate the conductive material 16 from the rest of the apparatus, the containers 10 and 12 are preferably made of insulative or non-conductive material. It will be obvious that any other suitable means may be employed to insulate the material 16, such as by coating the containers 10 and 12 with non-conductive material. It will also be apparent that the containers 10 and 12 may be made from conducting material and used as electrodes instead of the electrodes 18, 20. In addition, an agitator (not shown) may be employed for mixing the material when in a slurry state to maintain even distribution of the solid-liquid characteristics of the material 16.

In operation, since the material 16 is of a conducting nature, a current will flow from the battery 22 through the material 16, and the passage of this current will cause the liquefaction of the material 16. As heat is absorbed in the slurry state of the material 16 due to this current flow, the resistance increases, and therefore, the current is decreased. This process will reach an equilibrium when the heat generated in the material 16 exactly equals the heat lost by conduction, radiation, etc. from the container 12. The rheostat 28 serves as a means for adjusting the current flow so that this equilibrium point may be established at the temperature of liquefaction of the material 16.

Accurate temperature regulation is obtained since the material 16 is chosen to have a high latent heat of fusion so that when the material 16 is in a slurry state, any heat loss through radiation, conduction, etc., causes solidification and involves only the heat of fusion without effecting the temperature of the material 16. On the other hand, any gain in heat, say by an overload from the battery 22 or from any other extraneous source, will result only in absorption of this heat as the slurry mass becomes more liquid than solid. In addition, due to the inherent balancing effect of the resistance-current values, the system is completely self-regulating once the desired characteristics have been established by adjustment of the rheostat 28.

Figure 2:
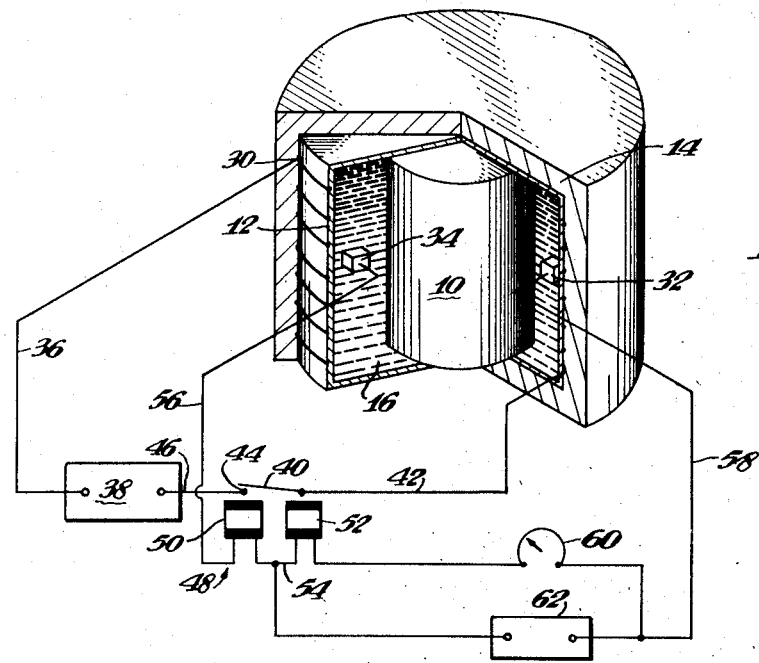
Fig. 2 is a similar schematic view of another circuit arrangement.

In the modification shown in Fig. 2, the material 16 is heated by a resistance winding in the form of a heater element 30 wound around the outer container 12 and a pair of electrodes 32, 34 immersed in the material 16 which serve to sense the resistance within the material 16. The heater element 30 is connected by a conductor 36 to one terminal of a battery and to a switch arm 40 by a conductor 42. To complete the heating circuit to the heater element 30, the switch arm 40 is adapted to engage and be normally biased from a stationary contact 44 connected by a conductor 46 to the battery 38.

Actuation of the switch arm 40 into engagement with the stationary contact 44 for effecting energization of the heater element 30 is provided for and takes the form of a relay 48 having a pair of coils 50, 52, one side of each being connected by a wire 54. The sensing electrode 34 is connected by a conductor 56 to the other side of the coil 50. A second conductor 58 connects the sensing electrode 32 with the other side of the coil 52 through a rheostat 60 which serves to adjust the resistance within the sensing circuit at which the relay will be energized when the material 16 has reached a predetermined liquid-solid ratio in accordance with the intrinsic resistance therein. A small battery 62 of low voltage and amperage is connected in parallel with the coil 52 and the rheostat 60 and cooperates with the rheostat 60 for permitting finer adjustment and energization of the relay 48.

In operation, the current flow in the heater element 30 is turned on and off by the relay 48 in accordance with the internal resistance of the material 16 when in a predetermined stage of the slurry condition. As the liquid content in the slurry decreases, the resistance drops thus permitting an increase in the current flow therethrough whereby the relay 48 becomes energized to attract the switch arm 40 into engagement with the contact 44. Upon this occurrence, additional power is supplied to the heater element 30 from the battery 38 and more heat is absorbed by the material 16 to effect a greater solid to liquid ratio. When the liquid content and subsequently the resistance of the material rises, the relay 48 is deenergized and the switch arm 40 will open to cut off power to the heater element 30.

Figure 3:
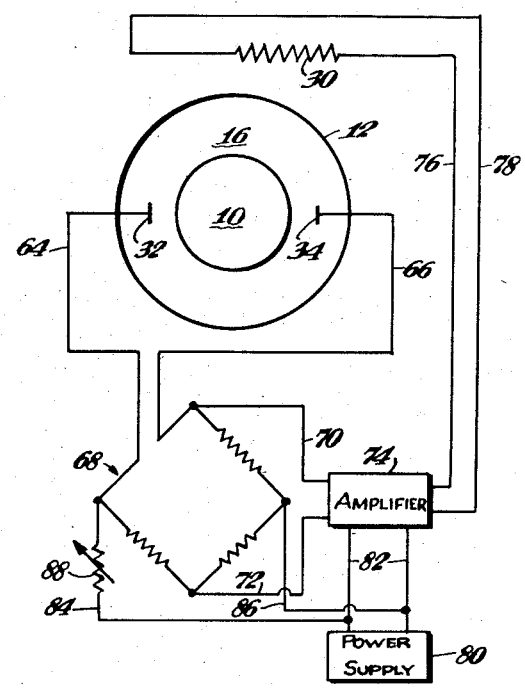
Fig. 3 is a circuit diagram of another modification of the arrangement shown in Fig. 2.

The modification shown in Fig. 3 is similar to that disclosed in Fig. 2 except that the relay 48 and its associated circuitry is replaced by a power amplifier. The sensing electrodes 32, 34 in the material 16 are connected by conductors 64, 66 respectively to one arm of a resistance bridge generally indicated by the reference numeral 68, the diagonal of which is connected by a pair of wires 70, 72 to the input stage of an amplifier 74. A pair of conductors 76, 78 connect the heater element 30 to the output stage of the amplifier 74 which derives its power from a power supply 80 through a pair of conductors 82. To complete the bridge circuit, power is supplied to the bridge 68 from the power supply 80 through a pair of wires 84, 86 in the usual manner.

The amplifier 74 may be of any conventional type wherein the input stage is adapted to sense the unbalanced voltage from the bridge 68, amplify the voltage in proportion to the electrical resistance of the material 16 as reflected by the bridge 68 and energize the heater element 30 to a degree of heat proportional to the resistance of the material 16. A rheostat 88 is connected in the wire 84 and serves to adjust the power supply to the bridge 68 thereby varying the operating level at which the amplifier 74 is required to respond.

The advantage of this embodiment over the arrangement shown in Figs. 1 and 2 is that there will be no "on-off" condition in the heater element 30 since the heater element will be supplied with current from the amplifier 74 at all times; however, this current will be varied in accordance with the resistance change determined by the sensing elements at the input of the amplifier 74. Under normal operating conditions, the amplifier 74 will reach a stable operating condition, and there will be very little current change experienced in the heater element 30.

Figure 4:
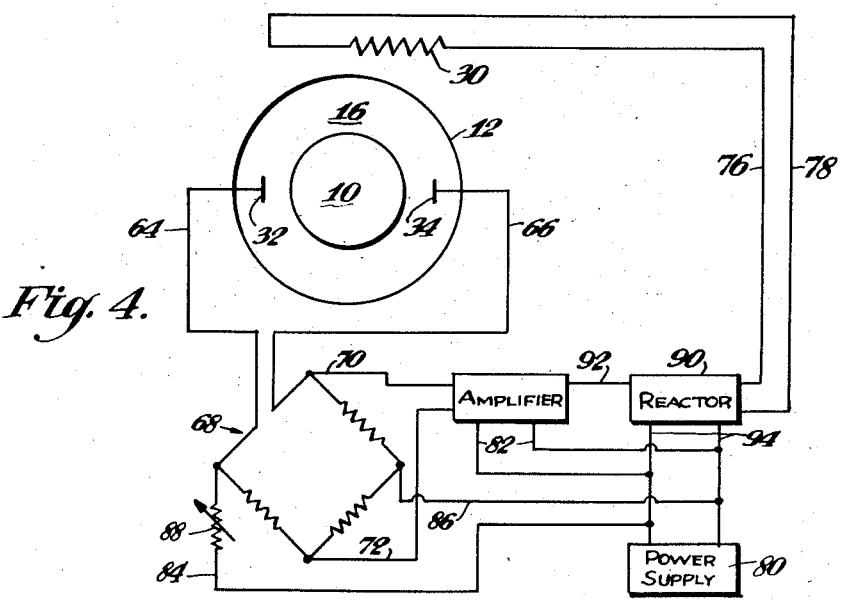
Fig. 4 is a circuit diagram of still another modification of the present invention.

The embodiment of Fig. 4 is similar to that of Fig. 3 and includes a saturable reactor in the output stage of the amplifier section of the system. As in the previous modifications, for simplicity, like components will be designated by like numerals.

Instead of directly energizing the heater element 30, the amplified signal from the amplifier 74 is fed to a saturable reactor 90 by a wire 92 to control the current to the heater element 30. As shown in Fig. 4, the conductors 76, 78 from the heater element 30 are connected to the output stage of the reactor 90 and the power supply 80 is connected to the reactor by wires 94. In this arrangement, the amplifier 74 may be of the low gain type for controlling the input winding (not shown) of the reactor 90.

While the embodiments of Figs. 1, 2, 3 and 4 are directed to the change of resistance characteristics in the slurry state of the fusible material 16, another characteristic is peculiar to the change of state of the material 16. Since the slurry consists of a mixture, in various proportions, of the liquid and solid material, it will be apparent that the viscosity of the slurry is a function of the change of state, and in fact, it has been found that the viscosity will vary over a very large range as the material changes from entirely solid to entirely liquid. In the embodiment of Fig. 6, a measure of viscosity is used as a sensing element for the heating control of the material 16.

Figure 5:
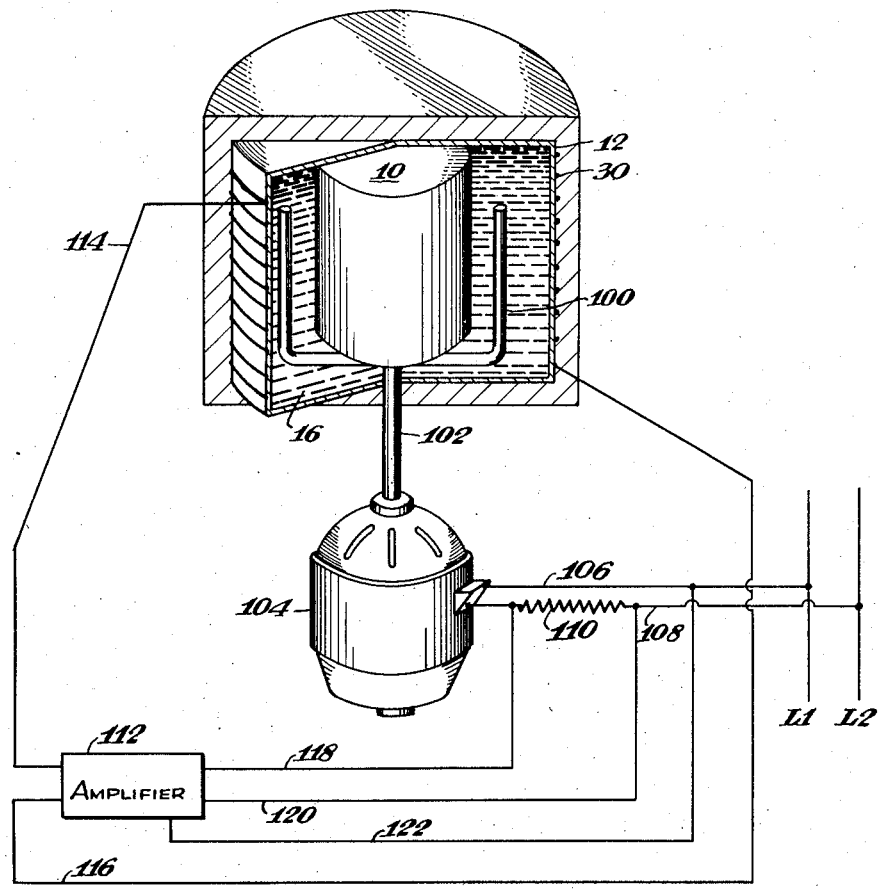
Fig. 5 is a schematic view showing still another arrangement of the present invention.

In Fig. 5, a pair of mixing arms 100 are immersed in the material 16 between the containers 10 and 12 and is connected to the operating shaft 102 of an electric motor 104 for rotation therewith. A pair of wires 106, 108 having a resistor 110 in series therewith connects the motor 104 to a source of electric current L1, L2 in the usual manner for energizing the motor 104.

The heater element 30 which is wound conductively around the outer container 12 is adapted to be energized by an amplifier 112 through a pair of conductors 114, 116 connected therebetween. The input stage of the amplifier 112 is connected across the resistor 110 by a pair of wires 118, 120, and a wire 122 connected between the source L1 and the amplifier 112 serves to complete the power supply to the amplifier 112 from the source L1, L2 through the wires 120, 122.

In operation, the voltage drop across the resistor 110 is proportional to the current drawn by the motor 104, which is in turn proportional to the mechanical resistance offered by the slurry of the material 16 to the rotation of the steering arms 100. Thus the greater the percentage of solid material 16 in the slurry, the higher the mechanical resistance, the greater the current drawn by the motor 112, the greater the voltage drop across the series resistor 110 and consequently, the greater the signal applied to the amplifier. Since the output of the amplifier 112 is connected to the heater element 30, as the mechanical resistance is increased due to an increase in the solid content of the slurry content, the power to the heater element 30 will be increased by the amplifier 112.

It will be apparent from the foregoing that the illustrated embodiments provide new and improved control devices for maintaining steady heat to a space within precise temperature limits and which utilizes various characteristics of a slurry of fusible material to control the application of heat to the slurry so that the material is never completely solid or completely liquid. It will also be obvious to those skilled in the art that the illustrated embodiments may be variously changed and modified, or features thereof, singly or collectively without departing from the scope of the invention or sacrificing all of the advantages thereof, and accordingly the disclosure herein is illustrative only and the invention is not limited thereto.

It is claimed and desired to secure by Letters Patent:

1. In a system for controlling a condition within a space, the combination comprising a container housing a heating element of fusible material having a predetermined fusion temperature, a control circuit including means for heating said material to fuse the same, an electrical bridge circuit having one leg thereof connected in series with said material for unbalancing said bridge circuit in accordance with resistance variations in said material during the fusion thereof, and means for detecting the unbalance of said bridge circuit for controlling energization of said means for heating said heating element.

2. In a condition controlling device, the combination comprising a container, a heating element of conductive fusible material disposed in said container and having a predetermined fusion temperature and a high latent heat of fusion, a second container carried within said first mentioned container in heat transfer relationship with said heating element, heating means associated with said first mentioned container for heating said heating element to the fusion temperature thereof, an electrical bridge circuit having one leg thereof connected in series with said heating element of unbalancing said bridge circuit in accordance with resistance variations in said heating element during the fusion thereof, and means for detecting the unbalance of said bridge circuit for controlling the energization of said heating means.

3. A temperature stabilizing and control apparatus comprising a first container, a second container carried within said first container, an electrically conductive fusible material having a predetermined fusion temperature and a high latent heat of fusion carried within said first container in heat transfer relationship with said second container, a heating control circuit including heating means associated with said first container for heating said fusible material to the fusion temperature thereof, a pair of electrodes in said fusible material for sensing the change in electrical resistance thereof, an electrical bridge circuit having one leg thereof connected in series with said electrodes, and an amplifier connected to said bridge circuit and said heating control circuit for sensing the unbalanced voltage in said bridge circuit and energizing said heating means in accordance therewith.

4. A temperature stabilizing and control apparatus as claimed in claim 3 wherein said bridge circuit and said amplifier are both connected to a common source of power.

5. A temperature stabilizing and control apparatus as claimed in claim 3 wherein said bridge circuit is energized by a power supply circuit including a rheostat therein to vary the power supply to said bridge circuit.

6. In a system for controlling a condition within a space, the combination comprising a container housing a heating element of fusible material having a predetermined fusion temperature, a control circuit including means for heating said heating element to fuse the same, an electrical bridge circuit having one leg thereof connected in series with said heating element and unbalanced in accordance with resistance variations in said heating element during the fusion thereof, a saturable reactor connected in said control circuit, and means being adapted to detect the unbalance of said bridge circuit for controlling the saturation of said reactor for energizing said means for heating said heating element.

7. In a condition controlling device, the combination comprising a container, a heating element of conductive fusible material disposed in said container and having a predetermined fusion temperature and a high latent heat of fusion, a second container carried within said first mentioned container in heat transfer relationship with said heating element, heating means associated with said first mentioned container for heating said heating element to the fusion temperature thereof, an electrical bridge circuit having one leg thereof connected in series with said heating element and unbalanced in accordance with resistance variations in said heating element during the fusion thereof, a saturable reactor for controlling the energization of said heating means, and means for detecting the unbalance of said bridge circuit for controlling the saturation of said reactor.

8. A temperature stabilizing and control apparatus comprising a first container, a second container carried within said first container, an electrically conductive fusible material having a predetermined fusion temperature and a high latent heat of fusion carried within said first container in heat transfer relationship with said second container, a heating control circuit including heating means associated with said first container for heating said fusible material to the fusion temperature thereof, a pair of electrodes in said fusible material for sensing a change in electrical resistance thereof, an electrical bridge circuit having one leg thereof connected in series with said electrodes, a saturable reactor in said heating control circuit for energizing said heating means, and an amplifier connected to said bridge circuit and said saturable reactor for sensing the unbalanced voltage in said bridge circuit and saturating said reactor in accordance therewith.

9. A temperature stabilizing and control apparatus as claimed in claim 8 wherein said bridge circuit, said saturable reactor and said amplifier are all connected to a common source of power.

10. A temperature stabilizing and control apparatus as claimed in claim 8 wherein said bridge circuit is energized by a power supply circuit including a rheostat therein to vary the power supply to said bridge circuit.

References Cited in the file of this patent

UNITED STATES PATENTS

| | | |
|---|---|---|
| 1,367,122 | Chubb et al. | Feb. 1, 1921 |
| 1,863,253 | Polin | June 14, 1932 |
| 1,921,432 | Stallard | Aug. 8, 1933 |
| 2,516,570 | Hartwig et al. | July 25, 1950 |
| 2,524,886 | Colander et al. | Oct. 10, 1950 |
| 2,608,635 | Mershon | Aug. 26, 1952 |
| 2,640,089 | Gilbert | May 26, 1953 |
| 2,726,312 | Dunlap | Dec. 6, 1955 |
| 2,767,296 | Welch | Oct. 16, 1956 |

OTHER REFERENCES

Wright: Journal of Scientific Instruments; vol. 24, October 1947, pp. 258–259.